(12) United States Patent
Nomoto et al.

(10) Patent No.: US 10,885,316 B2
(45) Date of Patent: Jan. 5, 2021

(54) APPARATUS FOR AUTHENTICATING AN OBJECT AND METHOD THEREOF

(71) Applicant: CANON KABUSHIKI KAISHA, Tokyo (JP)

(72) Inventors: Atsuo Nomoto, Tokyo (JP); Yoshinori Ito, Tokyo (JP); Hiroshi Sato, Kawasaki (JP); Satoshi Yashiro, Yokohama (JP); Hideo Noro, Tokyo (JP); Shunsuke Nakano, Inagi (JP); Kiyotaka Takahashi, Kawasaki (JP); Takahisa Yamamoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 259 days.

(21) Appl. No.: 16/047,614

(22) Filed: Jul. 27, 2018

(65) Prior Publication Data

US 2019/0034705 A1 Jan. 31, 2019

(30) Foreign Application Priority Data

Jul. 31, 2017 (JP) ................................. 2017-147944

(51) Int. Cl.
*G06K 9/00* (2006.01)
*G06K 9/20* (2006.01)
(Continued)

(52) U.S. Cl.
CPC ..... *G06K 9/00288* (2013.01); *G06K 9/00208* (2013.01); *G06K 9/00268* (2013.01);
(Continued)

(58) Field of Classification Search
CPC .. G06K 9/00288; G06K 9/2027; G06K 9/629; G06K 9/00268; G06K 9/00208;
(Continued)

(56) References Cited

U.S. PATENT DOCUMENTS

| 2009/0180672 A1* | 7/2009 | Ishiyama | .............. G06T 7/0002 |
| | | | 382/118 |
| 2015/0139492 A1* | 5/2015 | Murakami | ........... G06K 9/3241 |
| | | | 382/103 |
| 2015/0278584 A1* | 10/2015 | Nakano | .............. G06K 9/00288 |
| | | | 382/118 |

FOREIGN PATENT DOCUMENTS

| JP | 2001-283216 A | 10/2001 |
| JP | 2009-211177 A | 9/2009 |
| JP | 5574033 B2 | 8/2014 |

OTHER PUBLICATIONS

Debevec, P., "Imaging-Based Lighting", IEEE Computer Graphics and Applications, Mar./Apr. 2002, pp. 26-34, vol. 22, No. 2.

(Continued)

*Primary Examiner* — Phuoc Tran
(74) *Attorney, Agent, or Firm* — Canon U.S.A., Inc., IP Division

(57) ABSTRACT

Information processing apparatus includes an input unit configured to input a captured image capturing a target object in a real environment, an obtaining unit configured to obtain an illumination condition in the real environment; a generation unit configured to generate a variation image as an image of a registration object reflecting the illumination condition based on three-dimensional data of the registration object and the obtained illumination condition, and a collation unit configured to collate the registration object with the target object based on a feature amount of the variation image and a feature amount of the captured image.

18 Claims, 9 Drawing Sheets

(51) Int. Cl.
*G06K 9/62* (2006.01)
*G06T 7/90* (2017.01)
*G06T 7/33* (2017.01)
*G06T 7/55* (2017.01)

(52) U.S. Cl.
CPC ........... *G06K 9/2027* (2013.01); *G06K 9/629* (2013.01); *G06T 7/344* (2017.01); *G06T 7/55* (2017.01); *G06T 7/90* (2017.01); *G06K 9/6255* (2013.01); *G06K 2009/00328* (2013.01); *G06K 2209/21* (2013.01); *G06T 2207/10152* (2013.01); *G06T 2207/30201* (2013.01)

(58) Field of Classification Search
CPC ....... G06K 9/6255; G06K 2009/00328; G06K 2209/21; G06T 7/90; G06T 7/344; G06T 7/55; G06T 2207/10152; G06T 2207/30201
See application file for complete search history.

(56) References Cited

OTHER PUBLICATIONS

Viola, P., et al, "Rapid Object Detection using a Boosted Cascade of Simple Features", Accepted Conference on Computer Vision and Pattern Recognition, 2001, pp. 1-9.

* cited by examiner

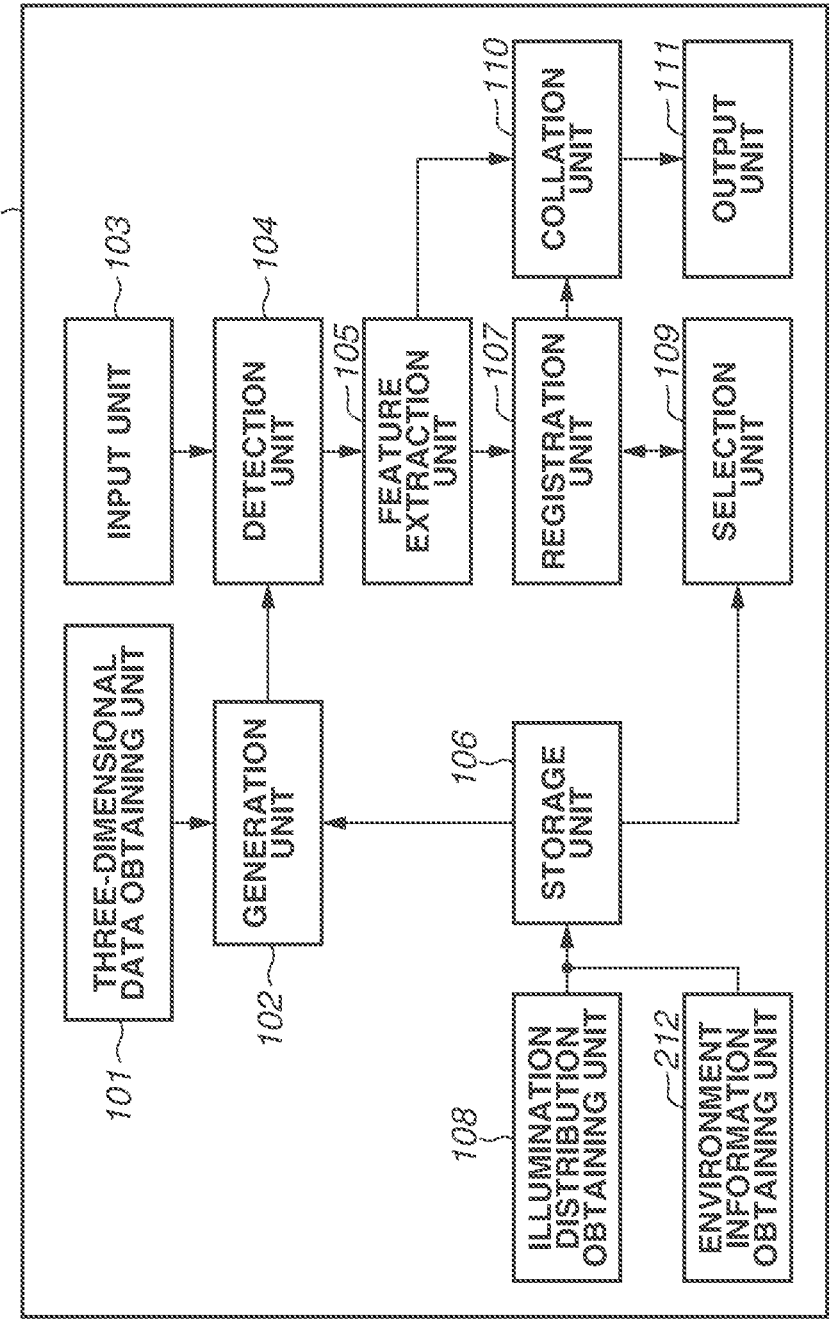

FIG.9

| No | ENVIRONMENT INFORMATION | ILLUMINATION DISTRIBUTION (ENVIRONMENT MAP) |
|---|---|---|
| 1 | DATE AND TIME: 2016/01/02 10:00:00<br>WEATHER: FINE<br>HUMIDITY: 20%<br>AMBIENT TEMPERATURE: 10°<br>PLACE: LATITUDE XX, LONGITUDE YY<br>NUMBER OF SURROUNDING PEOPLE: 5 PERSONS | 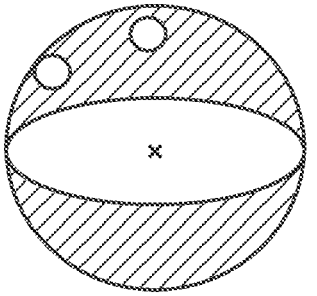 |
| 2 | DATE AND TIME: 2016/01/02 11:00:00<br>WEATHER: FINE<br>HUMIDITY: 18%<br>AMBIENT TEMPERATURE: 12°<br>PLACE: LATITUDE XX, LONGITUDE YY<br>NUMBER OF SURROUNDING PEOPLE: 6 PERSONS | 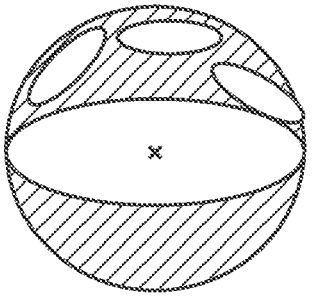 |
| ⋮ | ⋮ | ⋮ |

APPARATUS FOR AUTHENTICATING AN OBJECT AND METHOD THEREOF

BACKGROUND OF THE INVENTION

Field of the Invention

The present invention relates to an apparatus authenticating an object and a method thereof.

Description of the Related Art

Object authentication techniques have been proposed which compare objects such as people in images with objects preliminarily registered in dictionaries and determine whether they are the same objects. The object authentication techniques include, for example, face authentication techniques for authenticating faces of people. The object authentication techniques may be applied to security applications for realizing room access control using face images as passports, retrieval applications for retrieving specific people from databases of accumulated captured images, device control applications for automatically switching imaging parameters of digital cameras and the like according to a person, and the like. In these applications, images are captured under various illumination conditions. Thus, an object authentication technique is required which is robust over variation of illumination conditions.

As a technique for reducing an influence of an illumination condition, there is a method for generating variation images which are images of an object reflecting various it conditions from images of the object registered in advance and using the variation images for authentication.

For example, Japanese Patent No. 5574033 describes a following technique. Specifically, a technique is described which generates variation images which are images reflecting various illumination conditions in advance from a two-dimensional image or a standard three-dimensional model, compares an input image with the variation images, and uses the most similar variation image for collation by regarding that an illumination condition thereof is similar to an illumination condition of the input image. Accordingly, illumination conditions closer to the input image can be compared with each other, and improvement of accuracy can be expected.

Japanese Patent Application Laid-Open No. 2001-283216 describes a method for applying parameters such as a position and intensity of an illumination set in advance to a three-dimensional model and rendering a variation image. The three-dimensional model is used, and thus a more real variation image can be generated than generating a variation image from a two-dimensional image.

However, the above-described conventional methods cannot generate a variation image accurately reflecting an illumination condition in a real environment.

The technique described in Japanese Patent No. 5574033 is based on a two-dimensional image and a standard three-dimensional model, and thus cannot reproduce shades caused by irregularities on an object with irregularities such as a person's face. In addition, according to Japanese Patent No. 5574033, an illumination condition is expressed by a statistical expression using an illumination base, and there is a possibility that a variation image is generated which reflects an it illumination condition different from an illumination condition in a real environment.

According to Japanese Patent Application Laid-Open No. 2001-283216, a three-dimensional model for each individual is used, and thus shades caused by irregularities on a person's face can be reproduced. However, according to Japanese Patent Application Laid-Open 2001-283216, an illumination condition is expressed using a simple model which is expressed by a position and an angle of the illumination, and thus a variation image reflecting a complicated illumination condition in the real environment cannot be generated.

Therefore, the conventional methods have a limit to collation accuracy of an object.

SUMMARY OF THE INVENTION

According to an embodiment of the present invention, an information processing apparatus includes an input unit configured to input a captured image capturing a target object in a real environment, an obtaining unit configured to obtain an illumination condition in the real environment, a generation unit configured to generate a variation image as an image of a registration object reflecting the illumination condition based on three-dimensional data of the registration object and the obtained illumination condition, and a collation unit configured to collate the registration object with the target object based on a feature amount of the variation image and a feature amount of the captured image.

Further features will become apparent from the following description of exemplary embodiments with reference to the attached drawings.

BRIEF DESCRIPTION OF THE DRAWINGS

FIG. 8 illustrates an example of a function configuration of an information processing apparatus.

FIG. 9 illustrates an example of an illumination distribution.

DESCRIPTION OF THE EMBODIMENTS

Various exemplary embodiments are described below with reference to the attached drawings.

According to a first exemplary embodiment, an example is described in which an image processing system capturing and collating an image of a person's face as a collation target object performs room access control by a gate. An environment surrounding the gate installed near an entrance of a building is affected by not only a change of an indoor illumination but also external light, and an illumination condition is greatly changed compared with an indoor environment and the like. Thus, the image processing system measures a plurality of illumination conditions in the environment surrounding the gate, generates variation images reflecting the illumination conditions on a collation target object based on the measured illumination conditions, and collates the generated image with a captured image to be input.

System Configuration of Image Processing System

Figure 1:
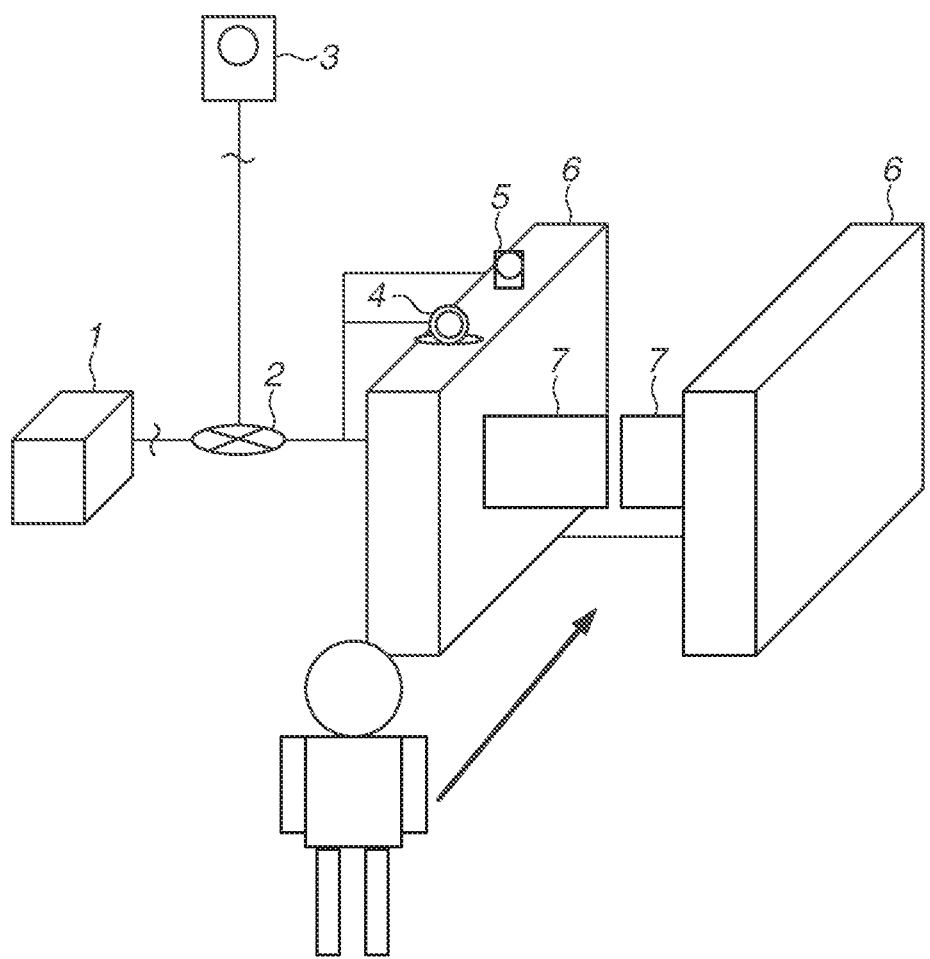
FIG. 1 illustrates an example of a system configuration and others of an image processing system.

FIG. 1 illustrates an example of a system configuration and others of the image processing system according to the present exemplary embodiment. The example in FIG. 1 illustrates a situation in which a person as a collation target is about to pass through a gate.

The image processing system includes an information processing apparatus 1, a three-dimensional data obtaining apparatus 3, an illumination distribution obtaining apparatus 4, an image capturing apparatus 5, the gate control apparatus 6, and flappers 7. The information processing apparatus 1, the three-dimensional data obtaining apparatus 3, the illumination distribution obtaining apparatus 4, the image capturing apparatus 5, and the gate control apparatus 6 are communicably connected with each other via a network 2. In the following description, an interval of the gate control apparatus 6 at which propriety of passage is controlled by the flappers 7 is referred to as a gate.

The information processing apparatus 1 communicates with the three-dimensional data obtaining apparatus 3, the illumination distribution obtaining apparatus 4, the image capturing apparatus 5, and the gate control apparatus 6 via the network 2, determines whether the collation target person is a person who can passes through the gate, and outputs a determination result to the gate control apparatus 6. The information processing apparatus 1 is an information processing apparatus such as a personal computer (PC), a server apparatus, and a tablet device.

The network 2 is a local area network and used for communication among the information processing apparatus 1, the three-dimensional data obtaining apparatus 3, the illumination distribution obtaining apparatus 4, the image capturing apparatus 5, and the gate control apparatus 6. The network 2 may be another network such as the Internet.

The three-dimensional data obtaining apparatus 3 which is a three-dimensional scanner obtains three-dimensional data of an object and outputs the data to the information processing apparatus 1 via the network 2. The three-dimensional data obtaining apparatus 3 obtains three-dimensional data of a collation target object (for example, a person) in advance and transmits the obtained three-dimensional data to the information processing apparatus 1. The information processing apparatus registers information of the transmitted three-dimensional data by storing in the secondary storage device 14 in advance which is described below with reference to FIG. 2.

According to the present exemplary embodiment, the three-dimensional data obtaining apparatus 3 is arranged in a place different from the gate control apparatus 6. The three-dimensional data obtaining apparatus 3 may not be a three-dimensional scanner but an information processing apparatus connected to a plurality of image capturing apparatuses. In this case, the three-dimensional data obtaining apparatus 3 may capture two-dimensional images of an object from a plurality of viewpoints via the plurality of connected image capturing apparatuses and obtain three-dimensional data of the object by stereo matching based on a plurality of captured two-dimensional images. Further, the information processing apparatus 1 may capture two-dimensional images of an object from a plurality of viewpoints via the plurality of image capturing apparatuses and obtain three-dimensional data of the object by stereo matching based on a plurality of captured two-dimensional images.

The illumination distribution obtaining apparatus 4 is an image capturing apparatus such as a camera equipped with a fish-eye lens for measuring illumination conditions of a surrounding three-dimensional space and transmits the measured illumination conditions to the information processing apparatus 1 via the network 2. The illumination distribution obtaining apparatus 4 measures an illumination direction, illumination intensity, a color temperature of illumination, and the like in a real environment surrounding the illumination distribution obtaining apparatus 4 as the illumination conditions.

The illumination distribution obtaining apparatus 4 measures surrounding illumination conditions in the real environment and generates two-dimensional images representing the measured illumination conditions. The illumination distribution obtaining apparatus 4 generates the two-dimensional images representing the measured illumination conditions by, for example, following processing. The illumination distribution obtaining apparatus 4 generates an image of a spherical or a dome shape space corresponding to a space in the real environment centering on the illumination distribution obtaining apparatus 4. The illumination distribution obtaining apparatus 4 arranges a circular object having a size corresponding to the illumination intensity on a position corresponding to the illumination direction on a surface of the spherical or the dome shape space in the image. Further, the illumination distribution obtaining apparatus 4 updates a display aspect of the surface of the spherical or the dome shape space in the image so as to be a pattern and a color representing a color temperature of the corresponding illumination. Furthermore, the illumination distribution obtaining apparatus 4 regards an image updating the display aspect of the surface as a two-dimensional image representing the measured illumination conditions.

In the following description, a two-dimensional image representing illumination conditions measured by the illumination distribution obtaining apparatus 4 is referred to as an illumination distribution. The illumination distribution obtaining apparatus 4 transmits the generated illumination distribution to the information processing apparatus 1. In a place affected by external light such as an entrance of a building, it is desirable that the illumination distribution obtaining apparatus 4 is an image capturing apparatus capable of performing high dynamic range (HDR) imaging so as to more accurately measure illumination conditions having a wide illumination intensity range like the sun.

According to the present exemplary embodiment, the illumination distribution obtaining apparatus 4 is an image capturing apparatus equipped with a fish-eye lens. However, the illumination distribution obtaining apparatus 4 may include, for example, a plurality of pairs of a normal camera and an automatic pan head and generate illumination distributions by capturing a plurality of images from a plurality of viewpoints and adding stitch processing thereto. The illumination distribution obtaining apparatus 4 may generate the illumination distribution by combining a normal camera, a mirror ball, a reflecting mirror, and the like. Further, the illumination distribution obtaining apparatus 4 may measure the illumination direction and the illumination intensity without measuring the color temperature when the color temperature not necessary for posterior collation processing.

The illumination distribution obtaining apparatus 4 generates the illumination distribution and transmits the generated illumination distribution to the information processing apparatus 1. However, the illumination distribution obtaining apparatus 4 may transmit information of the measured illumination conditions to the information processing apparatus 1, and the information processing apparatus 1 may generate the illumination distribution.

The image capturing apparatus 5 which is a network camera including an optical lens, a video sensor, and a communication unit captures an image of the collation target person and transmits the captured image to the information processing apparatus 1 via the network 2. The image capturing apparatus 5 is a single image capturing apparatus, however, may include a plurality of image capturing apparatuses.

The gate control apparatus 6 transmits a control signal for controlling open and close to a driving unit of the flappers 7 according to an authentication result of the collation target person obtained from the information processing apparatus 1. The gate control apparatus 6 controls an entrance of a person by opening and closing the flappers 7.

The flappers 7 includes an opening and closing unit and the driving unit for driving the opening and closing unit and physically controls a passage of a person through the gate.

According to the present exemplary embodiment, each component in the image processing system is a separate component. However, a component may have a function of another component, and the image processing system may not include the another component. For example, the illumination distribution obtaining apparatus 4 may be an apparatus which the same as the image capturing apparatus 5 and has the functions of the image capturing apparatus 5 and capture an image of the collation target object. Further, the information processing apparatus 1 may be an apparatus which is the same as the gate control apparatus 6 and has the functions of the gate control apparatus 6 and control the flappers 7.

According to the present exemplary embodiment, the three-dimensional data obtaining apparatus 3 is arranged in a place different from the gate control apparatus 6, however, may be arranged near the gate control apparatus 6 (for example, in the same room as the gate control apparatus, or a location within a distance of five meters from the date control apparatus 6).

Hardware Configuration of Information Processing Apparatus

Figure 2:
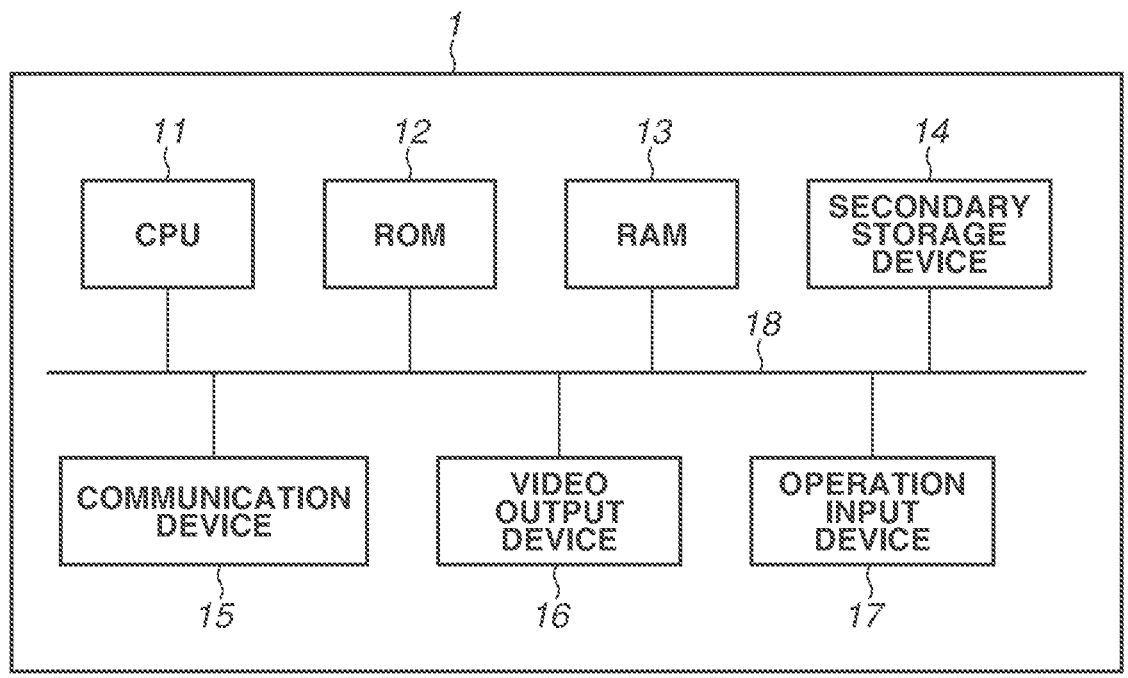
FIG. 2 illustrates an example of a hardware configuration of an information processing apparatus.

FIG. 2 illustrates an example of a hardware configuration of the information processing apparatus 1. The information processing apparatus 1 includes a central processing unit (CPU) 11, a read-only memory (ROM) 12, a random access memory (RAM) 13, a secondary storage device 14, a communication device 15, a video output device 16, and an operation input device 17. Each component is communicably connected with each other via a connection bus 18.

The CPU 11 executes a control program stored in the ROM 12 and the RAM 13 and entirely controls the apparatus.

Figure 4:
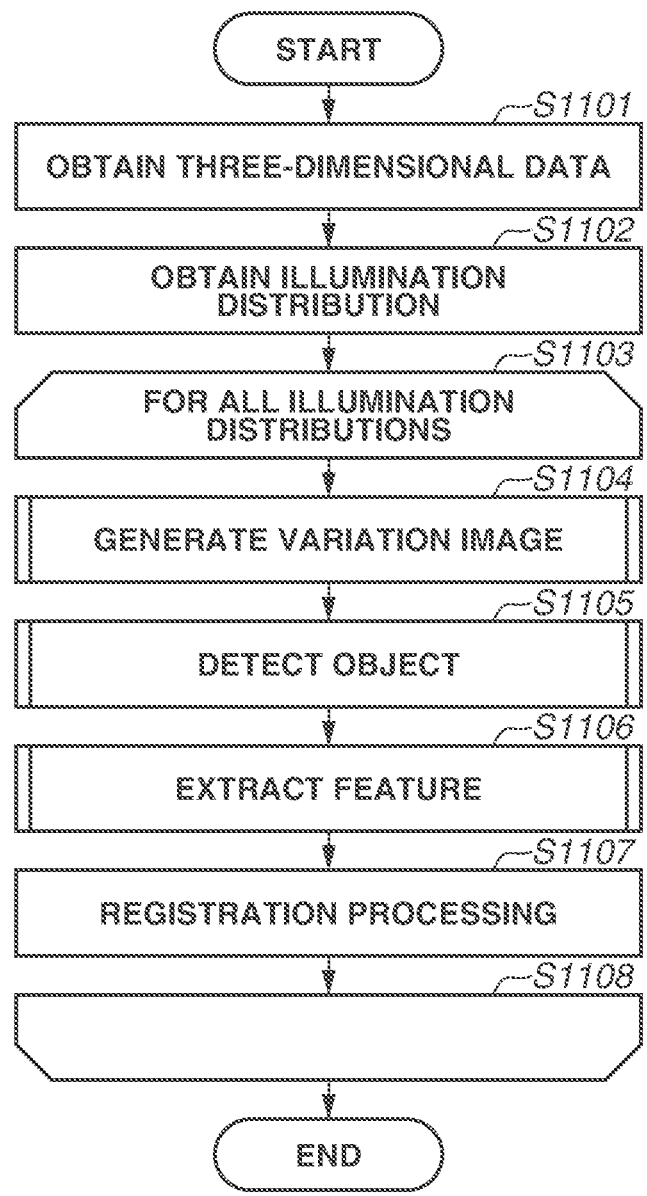
FIG. 4 is a flowchart illustrating an example of object registration processing.
Figure 5:
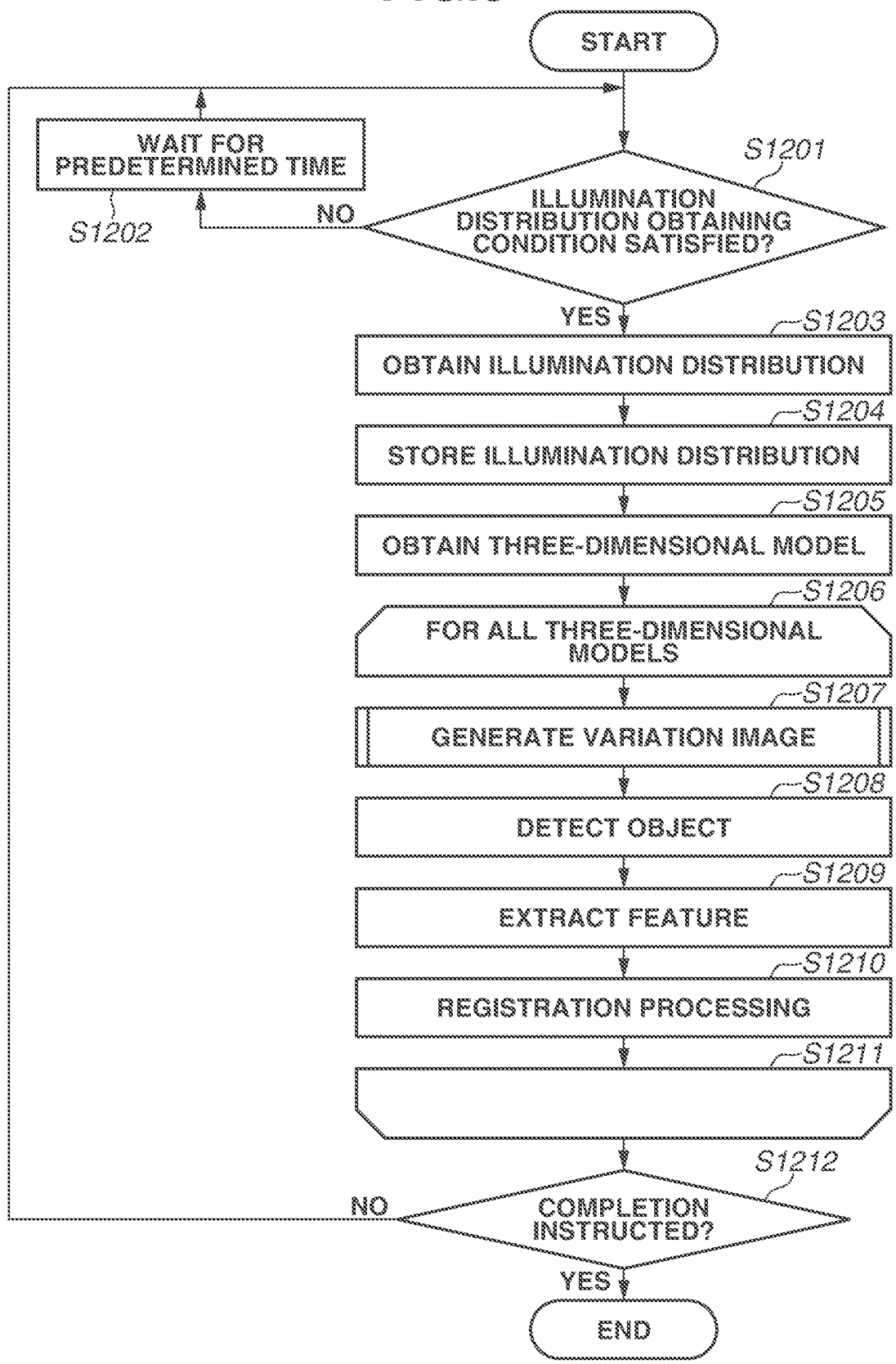
FIG. 5 is a flowchart illustrating an example of illumination distribution registration processing.
Figure 6:
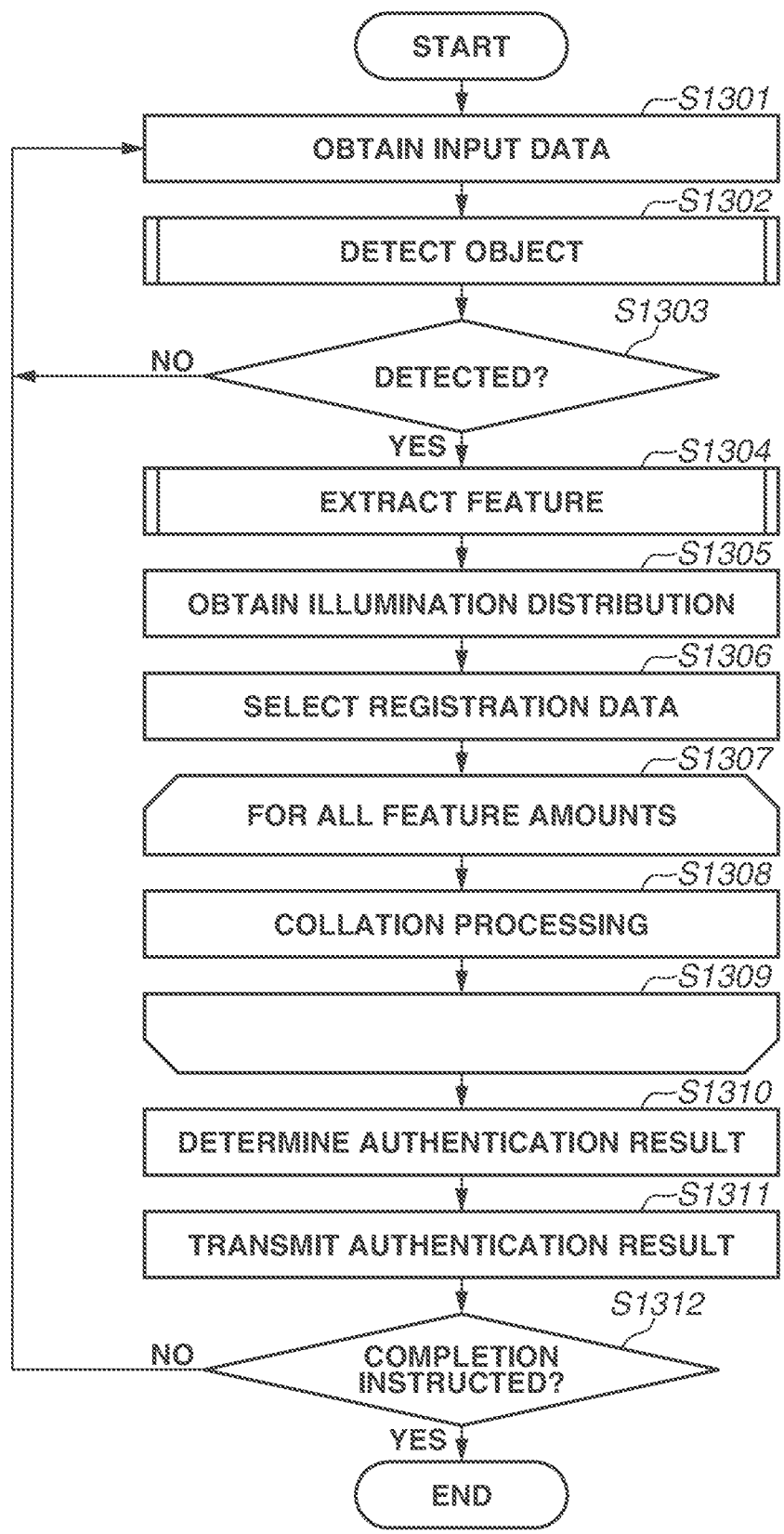
FIG. 6 is a flowchart illustrating an example of collation processing.

The ROM 12 is a nonvolatile memory and stores a control program, various parameter data pieces, and the like. The control program is executed by the CPU 11, and each processing described below with reference to FIGS. 4 to 6 is realized.

The RAM 13 is a volatile memory and temporarily stores image data, data of an execution result of the control program, and the like.

The secondary storage device 14 is a rewritable secondary storage device such as a hard disk, a solid state drive, and a flash memory and stores various programs, various setting information pieces, image data, three-dimensional data, illumination distribution data, information pieces of various threshold values, and the like. The secondary storage device 14 further stores a control program, various setting contents, processing results, and the like which are output to the RAM 13 when the CPU 11 executes the control program.

The communication device 15 is a wired communication unit used in communication with another apparatus via the network 2. The communication device 15 may be a wireless communication unit.

The video output device 16 is a monitor such as a cathode ray tube (CRT) and thin film transistor (TFT) liquid crystal and displays an image transmitted from the RAM 13 by the CPU 11, an execution result of the control program, and the like.

The operation input device 17 is a device such as a keyboard and a mouse for receiving an input via an operation by a user.

The CPU 11 executes processing based on a program stored in the ROM 12 and the secondary storage device 14, and thus functions of the information processing apparatus described below with reference to FIGS. 3 and 8 and processing in flowcharts described below with reference to FIGS. 4 to 6 are realized.

Function Configuration of Information Processing Apparatus

Figure 3:
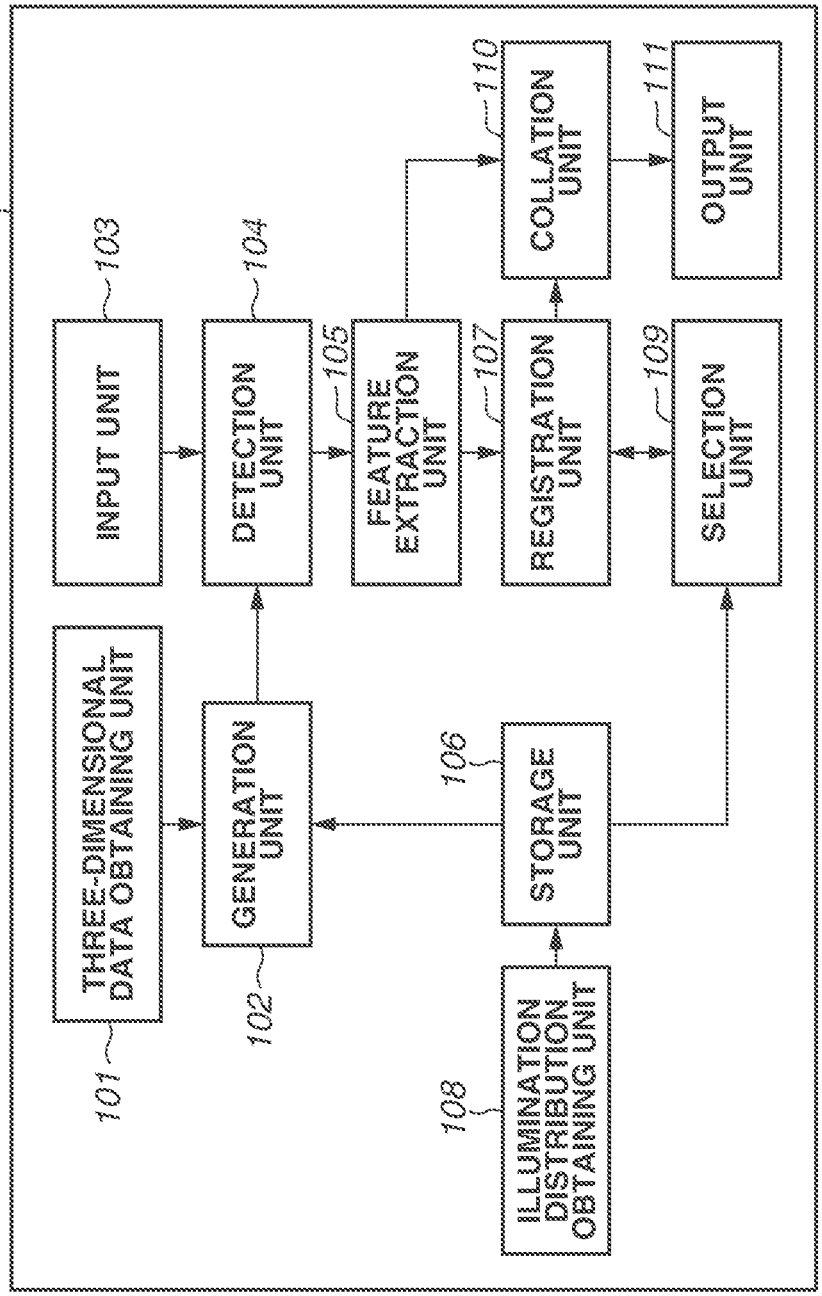
FIG. 3 illustrates an example of a function configuration of the information processing apparatus.

FIG. 3 illustrates an example of a function configuration of the information processing apparatus 1 according to the present exemplary embodiment. The information processing apparatus includes a three-dimensional data obtaining unit 101, a generation unit 102, an input unit 103, a detection unit 104, a feature extraction unit 105, a storage unit 106, a registration unit 107, an illumination distribution obtaining unit 108, a selection unit 109, a collation unit 110, and an output unit 111.

The three-dimensional data obtaining unit 101 obtains three-dimensional data of an object via the three-dimensional data obtaining apparatus 3 and stores the three-dimensional data in the secondary storage device 14. According to the present exemplary embodiment, the three-dimensional data obtaining unit 101 obtains three-dimensional data of a person's face to be a collation processing target.

The generation unit 102 generates a variation image which is an image of the person's face to which illumination conditions indicated by an illumination distribution is reflected based on the three-dimensional data obtained by the three-dimensional data obtaining unit 101 and the illumination distribution stored in the storage unit 106. The variation image is, for example, a two-dimensional image rendered from the three-dimensional data of the person's face under the illumination conditions indicated by the illumination distribution. The generation unit 102 transmits the generated variation image to the detection unit 104 in association with illumination distribution information indicating which illumination distribution the variation image is generated from. The illumination distribution information includes, for example, time information, place information, and weather information when the illumination distribution is obtained and a number for identifying the illumination distribution.

The input unit 103 captures a two-dimensional image of an object such as a person about to pass through the gate via the image capturing apparatus 5 and transmits the two-dimensional image to the detection unit 104. The image of the object captured by the input unit 103 via the image capturing apparatus 5 is an example of an input image.

The detection unit 104 detects the object from the image transmitted from the input unit 103 or the variation image transmitted from the generation unit 102. According to the present exemplary embodiment, the detection unit 104 detects a person's face as an object of a detection target, extracts a face area of the detected face respectively from the image transmitted from the input unit 103 and the variation image transmitted from the generation unit 102, and transmits data pieces of the extracted face are areas to the feature extraction unit 105. The detection unit 104 associates the face area data extracted from the variation image with the illumination distribution information indicating which illumination distribution the variation image is generated from as with the generation unit 102. When the image processing system performs collation of an object other than a person's face, the detection unit 104 will detect a collation target object.

The feature extraction unit 105 extracts a feature amount from the face area data transmitted from the detection unit 104. The feature extraction unit 105 transmits the extracted feature amount to the registration. unit 107 or the collation unit 110. Further, regarding the feature amount extracted from the face area data associated with the illumination distribution information, the feature extraction unit 105 transmits the extracted feature amount to the registration unit 107 or the collation unit 110 in association with the relevant illumination distribution information.

The storage unit 106 stores the illumination distribution transmitted from the illumination distribution obtaining unit 108 in the secondary storage device 14 and transmits the illumination distribution to the generation unit 102 or the selection unit 109.

The registration unit 107 stores the feature amount transmitted from the feature extraction unit 105 and the illumination distribution information associated with the feature amount in the secondary storage device 14 and transmits the feature amount and the illumination distribution information to the selection unit 109 or the collation unit 110. In this regard, the registration unit 107 stores the feature amount transmitted from the feature extraction unit 105 and the illumination distribution information associated with the feature amount in the secondary storage device 14 in association with person information indicating to whose face the feature amount belongs. The registration unit 107 obtains the person information based on an input operation by a user via the operation input device 17. In the following description, information of a combination of the illumination distribution information, the feature amount extracted from the face area in the variation image generated based on the illumination distribution indicated by the illumination distribution information, and the person information indicating to whose face area the feature amount belongs is referred to as registration data.

The illumination distribution obtaining unit 108 measures illumination conditions of a three-dimensional space in the real environment surrounding the illumination distribution obtaining apparatus 4 via the illumination distribution obtaining apparatus 4, obtains the illumination distribution based on the measured illumination conditions, and stores the illumination distribution in the storage unit 106.

The selection unit 109 selects the registration data including a feature amount to be used in collation from past registration data pieces stored in the secondary storage device 14 based on the illumination distribution obtained by the illumination distribution obtaining unit 108. The selection unit 102 transmits information of the selected registration data to the collation unit 110.

The collation unit 110 collates the feature amount extracted from the image obtained by the input unit 103 which is transmitted from the feature extraction unit 105 with the feature amount included in the registration data transmitted from the selection unit 109 and transmits a collation result to the output unit 111.

The output unit 111 outputs, for example, the collation result transmitted from the collation unit 110 to an external apparatus such as the gate control apparatus 6 via the communication device 15.

Outline of Processing in Image Processing System

According to the present exemplary embodiment, the image processing system generates registration data for each of a plurality of persons and a plurality of illumination distributions and registers the registration data pieces by storing in the secondary storage device 14.

According to the present exemplary embodiment, the image processing system executes object registration processing for newly registering registration date of a collation target person, illumination distribution registration processing for, when a new illumination distribution is obtained, registering registration data corresponding the illumination distribution, collation processing for collating an object, and the like. The image processing system may execute the illumination distribution registration processing in background of the collation processing. Each processing is described below.

Object Registration Processing

Object registration processing is processing for registering registration data of a person to be a collation target candidate. The object registration processing is processing for generating a variation image using a three-dimensional model of a newly obtained person and the illumination distribution already registered, extracting a feature amount used in collation from generated variation image, and generating and registering registration data.

FIG. 4 is a flowchart illustrating an example of the object registration processing.

In step S1101, the three-dimensional data obtaining unit 101 obtains three-dimensional data of a person's face to be a collation target candidate via the three-dimensional data obtaining apparatus 3. The three-dimensional data obtaining unit 101 obtains data including a polygon mesh indicating a shape of an object and texture expressing a material appearance of the object as the three-dimensional data of the object. According to the present exemplary embodiment, the three-dimensional data obtaining unit 101 obtains a face shape and a face image respectively as the polygon mesh and the texture.

In step S1102, the generation unit 102 obtains all illumination distributions stored in the secondary storage device 14 by the storage unit 106. The secondary storage device 14 preliminarily stores a plurality of illumination distributions stored by the storage unit 106 in the past. Processing for storing the illumination distribution is described in detail below with reference to FIG. 5. The illumination distribution is the two-dimensional image representing the illumination conditions in the real environment surrounding the illumination distribution obtaining apparatus 4. There is a method referred to as image based lighting for realizing real lighting without manual lighting. According to the present exemplary embodiment, the image processing system uses image based lighting for expressing lighting at a site where a collation target person exists with reality.

In step S1103, the generation unit 102 selects one from all or the illumination distributions obtained in step S1102 and performs control to execute processing in steps S1104 to S1108 on the selected illumination distribution. The generation unit 102 repeats the processing and performs the control to execute the processing in steps S1104 to S1108 on all the illumination distributions obtained in step S1102.

In step S1104, the generation unit 102 generates a variation image as an image of the person's face as the collation target candidate under the illumination conditions indicated by the illumination distribution based on the illumination distribution selected in step S1103 and the three-dimensional data obtained in step S1101. In step S1104, the generation unit 102 generates the variation image using a method referred to as image based lighting (IBL) which performs lighting using the illumination distribution (the two-dimensional image). The generation unit 102 generates the variation image using, for example, a method described in a following reference document 1. Reference document 1: DEBEVEC, P., "Image-Based Lighting", IEEE Computer Graphics and Application., Vol 22, No. 2, March/April, 2002.

In step S1105, the detection unit 104 detects the person's face from the variation image generated in step S1104. The detection unit 104 detects the face using, for example, a method described in a following reference document 2. Reference document 2: P. Viola, M. Jones, 2001, Rapid object detection using a boosted cascade of simple features.

The detection unit 104 determines, for example, coordinates of a rectangular area representing the face area in the image as a detection result of the face. The detection unit 104 performs normalization processing on the detected face area so as to maintain a face size and an inclination of the constant. In addition, the detection unit 104 may extract feature points such as eyes and a nose of the face and output a partial area of the face. The detection unit 104 extracts the feature point of the face using, for example, a method described in a following reference document 3.
Reference document 3: Japanese Patent Application Laid-Open No. 2009-211177

In step S1106, the feature extraction unit 105 extracts the feature amount from the area of the person's face detected in step S1105. The feature extraction unit 105 extracts, for example, a local binary pattern (LBP) feature amount. The feature extraction unit 105 may extract a feature amount such as a Histogram of Oriented Gradient (HOG) feature amount and a Scale-Invariant Feature Transform (SIFT) feature amount. The feature extraction unit 105 may extract a feature amount obtained by, for example, mixing a plurality of an LBP feature amount, an HOG feature amount, and a SIFT feature amount. Further, the feature extraction unit 105 may extract a feature amount using a neural network. Furthermore, the feature extraction unit 105 may newly regard a value obtained by performing dimensional compression on an extracted feature amount using a method such as principal component analysis (PCA) as a feature amount.

In step S1107, the registration unit 107 stores a combination of the feature amount extracting in step S1106, the person information indicating from whose face the feature amount is extracted, and the illumination distribution information indicating on which illumination distribution the generated feature amount is based in the secondary storage device 14 as the registration data.

In step S1108, the generation unit 102 determines whether the processing in steps S1103 to S1107 is completed on all the illumination distributions obtained in step S1102. The generation unit 102 terminates the processing in the flowchart in FIG. 4 when determining that the processing in steps S1103 to S1107 is completed on all the illumination distributions obtained in step S1102. The generation unit 102 advances the processing to step S1103 when determining that there is the illumination distribution obtained in step S1102 on which the processing in steps S1103 to S1107 is not completed.

The object registration processing has been described above.

According to the present exemplary embodiment, the information processing apparatus obtains the illumination distribution after obtaining the three-dimensional data of the collation target object, however, may obtain the three-dimensional data of the collation target object after obtaining the illumination distribution without limiting to this order.

According to the present exemplary embodiment, the information processing apparatus 1 generates the variation image corresponding to each of all the illumination distributions stored in the secondary storage device 14, however, may generate the variation images only a part of the illumination distributions. For example, when a plurality of similar illumination distributions is stored, the information processing apparatus 1 may regard one in the plurality of similar illumination distributions as a representative illumination distribution and generate a variation image based on the representative illumination distribution, and may not use the other illumination distributions. Processing for determining whether the illumination distribution is described in detail below with reference to FIG. 7.

Illumination Distribution Registration Processing

Illumination distribution registration processing is described below. The illumination distribution registration processing is processing for, when an illumination distribution is newly obtained, generating and registering registration data corresponding to the obtained illumination distribution. In other words, the illumination distribution registration processing is processing for generating a variation image based on the newly obtained illumination distribution and the three-dimensional data of the object as the collation target already obtained at that time point and registering the variation image. The image processing system can record illumination distributions changing real time, generate registration data pieces corresponding to the illumination distributions, and register the registration data pieces by the illumination distribution registration processing.

FIG. 5 is a flowchart illustrating an example of the illumination distribution registration processing.

In step S1201, the illumination distribution obtaining unit 108 determines whether to execute obtainment of the illumination distribution. According to the present exemplary embodiment, the image processing system periodically obtains the illumination distribution at a predetermined time interval. Thus, the illumination distribution obtaining unit 108 determines to execute the obtainment of the illumination distribution when an elapsed time from the previous obtainment of the illumination distribution is the predetermined time or more. Whereas, when an elapsed time from the previous obtainment of the illumination distribution is less than the predetermined time, the illumination distribution obtaining unit 108 determines not execute the obtainment of the illumination distribution.

The illumination distribution obtaining unit 108 advances the processing to step S1203 when determining to execute the obtainment of the illumination distribution (YES in step S1201) and advances the processing to S1202 when determining not to execute the obtainment of the illumination distribution (NO in step S1201).

In step S1202, the illumination distribution obtaining unit 108 waits for a predetermined time.

In step S1203, the illumination distribution obtaining unit 108 obtains the illumination distribution, for example, via the illumination distribution obtaining apparatus 4.

In step S1204, the storage unit 106 stores the illumination distribution obtained in step S1203 in the secondary storage device 14.

In step S1205, the generation unit 102 obtains three-dimensional models of the object stored in the secondary storage device 14 by the three-dimensional data obtaining unit 101 and obtains the illumination distribution obtained in step S1203 from the secondary storage device 14.

In step S1206, the generation unit 102 selects one from all of the three-dimensional models obtained in step S1205 and performs control to execute processing in steps S1207 to S1211 on the selected three-dimensional model. The generation unit 102 repeats the processing and performs the control to execute the processing in steps S1207 to S1211 on all the three-dimensional models obtained in step S1205.

In step S1207, the generation unit 102 generates a variation image based on the three-dimensional data selected in step S1206 and the illumination distribution obtained in step S1203.

In step S1208, the detection unit 104 detects a person's face from the variation image generated in step S1207.

In step S1209, the feature extraction unit 105 extracts the feature amount from the face area in the variation image detected in step S1206.

In step S1210, the registration unit 107 stores a combination of the extracted feature amount, the person information indicating from whose face the feature amount is extracted, and the illumination distribution information indicating the illumination distribution obtained in step S1203 in the secondary storage device 14 as the registration data. The registration unit 107 stores information such as a character string representing a name of a person and a number for identifying the person as the person information.

In step S1211, the generation unit 102 determines whether the processing in steps S1207 to S1210 is completed on all the three-dimensional models obtained in S1205. The generation unit 102 advances the processing to step S1212 when determining that the processing in steps S1207 to S1210 is completed on all the three-dimensional models obtained in step S1205. The generation unit 102 advances the processing to step S1206 when determining that there is the three-dimensional model obtained in step S1205 on which the processing in steps S1207 to S1210 is not completed.

In step S1212, the illumination distribution obtaining unit 108 determines whether a completion instruction of the illumination distribution registration processing is received based on an input operation from a user via the operation input device 17. The illumination distribution obtaining unit 108 terminates the processing in the flowchart in FIG. 5 when determining that the completion instruction of the illumination distribution registration processing is received (YES in step S1212) and advances the processing to step S1201 when determining that the completion instruction of the illumination distribution registration processing is not received (NO in step S1212).

The illumination distribution registration processing has been described above.

According to the present exemplary embodiment, the three-dimensional data, the illumination distribution, and the data of the feature amount are respectively managed by an individual functional component of the information processing apparatus 1, however, a single functional component may manage all data pieces.

According to the present exemplary embodiment, in step S1201, the illumination distribution obtaining unit 108 performs the obtainment the illumination distribution when a predetermined time has elapsed from a time at which the illumination distribution is previously obtained. However, the illumination distribution obtaining unit 108 may not perform the processing in step S1203 and subsequent steps, for example, when current illumination conditions obtained via the illumination distribution obtaining apparatus 4 is similar to any of the illumination conditions corresponding to the illumination distributions obtained in the past. In addition, the illumination distribution obtaining unit 108 may perform the processing in step S1203 and the subsequent steps, for example, when the current illumination conditions obtained via the illumination distribution obtaining apparatus 4 is not similar to the illumination conditions corresponding to the illumination distributions obtained in the past.

The image processing system accumulates registration data pieces corresponding to illumination distributions obtained in the past and three-dimensional models of persons obtained in the past in the secondary storage device 14 and thus accumulates feature amounts to be used in collation corresponding to various illumination conditions. Accordingly, the image processing system can perform collation processing taking various illumination conditions into consideration on an image input as a collation target. Therefore, there is a case in which registration data corresponding to the similar illumination distribution is not necessary to be reregistered.

Thus, the illumination distribution obtaining unit 108 does not perform the processing in step S1203 and the subsequent steps when the illumination conditions corresponding to the illumination distribution obtained in the past is similar to the current illumination conditions obtained via the illumination distribution obtaining apparatus 4. Accordingly, the image processing system can reduce a burden of unnecessary processing. The processing for determining whether the illumination distribution is similar is described below with reference to FIG. 7.

Collation Processing

Collation processing is described below.

FIG. 6 is a flowchart illustrating an example of the collation processing.

In step S1301, the input unit 103 captures an image of a face of a person who is about to pass through the gate via the image capturing apparatus 5.

In step S1302, the detection unit 104 detects the person's face from the image captured in step S1301. If there is a person who is about to pass through the gate, the person is detected and collated by the detection unit 104 in step S1302. The detection unit 104 detects a person from a range predetermined as a range in which a person passing through the gate can be captured in the image captured in step S1301. Accordingly, the detection unit 104 can reduce a possibility of a malfunction of the gate by collating a person standing at a position away from the gate. The detection unit 104 may detect a face from an entire area of the image captured in step S1301.

In step S1303, the detection unit 104 determines whether one or more faces are detected step S1302. The detection unit 104 advances the processing to step S1304 when determining that one or more faces are detected in step S1302 (YES in step S1302) and advances the processing to step S1301 when determining that no face is detected in step S1302 (NO in step S1302).

In step S1304, the feature extraction unit 105 extracts a feature amount from the face area detected in step S1302 in the image captured in step S1301. When a plurality of faces is detected in step S1302, the feature extraction unit 105 extracts a feature amount from a face having a largest size. The feature extraction unit 105 may determine a face detected in a predetermined coordinate range in the image captured in step S1301 as a target face from which a feature amount is extracted. Accordingly, when the collation target person passes through the gate, the information processing apparatus 1 can reduce a possibility to open and close the flappers 7 by performing collation according to a feature amount detected from another person. The feature extraction unit 105 may extract a feature amount from each of all the face areas detected in step S1302. In this case, the information processing apparatus 1 controls open and close when each person comes in front of the flappers 7 by tracking the face and the like.

In step S1305, the illumination distribution obtaining unit 108 obtains the illumination distribution via the illumination distribution obtaining apparatus 4. Accordingly, the illumination distribution obtaining unit 108 can obtain the illumination conditions in the real environment when a person is about to pass through the gate.

In step S1306, the selection unit 109 selects the registration data including the feature amount used in the collation from a plurality of the registration data pieces stored in the storage unit 106 based on the illumination distribution obtained in step S1305.

Figure 7:
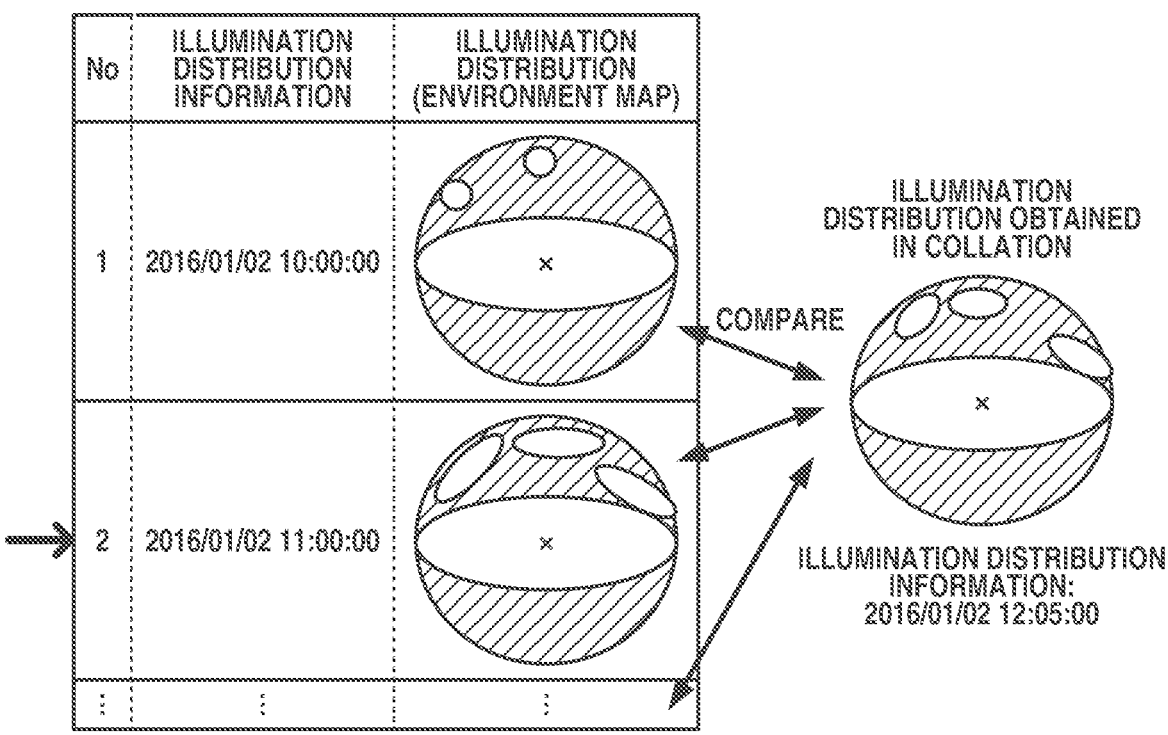
FIG. 7 illustrates an example of a selection method of registration data.

FIG. 7 illustrates an example of a selection method of registration data. A table indicating past illumination distributions stored in the secondary storage device 14 by the storage unit 106 is indicated in an upper left part in FIG. 7. In addition, an illumination distribution (the illumination distribution obtained in step S1305) obtained in the collation is indicated in an upper right part in FIG. 7. Information pieces of the illumination distributions stored in the secondary storage device 14 by the storage unit 106 are associated with the distribution information indicating when the respective illumination distribution was captured. The illumination distribution is a two-dimensional image including a spherical or a dome shape figure.

In a lower part of FIG. 7, registration data pieces stored in the secondary storage device by the registration unit 107 are indicated. As shown in the lower part of FIG. 7, the registration data is information of a combination of a feature amount (vector), person information, and illumination distribution information of illumination distribution used in a variation image from which the feature amount is extracted. An example of a method for the selection unit 109 to select the registration data is described with reference to FIG. 7.

The selection unit 109 first compares the past illumination distributions and the illumination distribution obtained in step S1305 and specifies the illumination distribution similar to the illumination distribution obtained in step S1305 from the past illumination distribution. The illumination distribution is a two-dimensional image. Thus, the selection unit 109 can compare the illumination distributions using a known comparison method as described below. The selection unit 109 can compare the illumination distributions using, for example, Cosine similarity. When similarity is defined as S, Cosine similarity is expresses by a following Formula 1.

$$S=(A \cdot B)/(|A||B|) \qquad \text{(Formula 1)}$$

In Formula 1, a term A is a vector arranging pixel values of the illumination distribution obtained in step S1305. A term B is a vector arranging pixel values of the past illumination distributions compared with the illumination distribution obtained in step S1305. In addition, A, B∈RD is satisfied. A term D is a dimension number which is, for example, the number of pixels of the illumination distribution.

The selection unit 109 obtains the similarity S to the illumination distribution obtained in step S1305 with respect to each past illumination distribution stored in the secondary storage device 14 using Formula 1. The selection unit 109 specifies the past illumination distribution corresponding to the largest similarity S as the illumination distribution similar to the illumination distribution obtained in step S1305. Further, the selection unit 109 may specify the past illumination distribution corresponding to the similarity S having a predetermined threshold value or more as the illumination distribution similar to the illumination distribution obtained in step S1305.

The selection unit 109 may use a distance scale other than Cosine similarity as a distance scale used for comparison of two illumination distribution. The selection unit 109 may use, for example, normalized cross correlation. Further, the selection unit 109 may compare two illumination distributions using a method of metric learning for calculating a distance function by learning. Furthermore, the selection unit 109 may normalize the similarity obtained using Formula 1 to be a value in a predetermined range.

The selection unit 109 specifies the illumination distribution similar to the illumination distribution obtained in step S1305 from the past illumination distributions and then selects the registration data corresponding to the specified illumination distribution. It is assumed that the selection unit 109 specifies, for example, the illumination distribution of No. 2 (data indicated by an arrow in FIG. 7) in the table in the upper left part in FIG. 7 as the illumination distribution similar to the illumination distribution obtained in step S1305.

Subsequently, the selection unit 109 selects the registration data of which the corresponding illumination distribution information matches with the illumination distribution information corresponding to the specified illumination distribution in the registration data pieces stored in the secondary storage device 14 which are indicated in the table in the lower part in FIG. 7. The illumination distribution information corresponding to No. 2 illumination distribution specified by the selection unit 109 is "2016/01/02 11:00:00". Thus, the selection unit 109 selects the registration data of which the corresponding illumination distribution information is "2016/01/02 11:00:00" from the registration data pieces stored in the secondary storage device 14. The selection unit 109 selects the registration data pieces of No. 2, No. 5, and No. 7 (data pieces indicated by arrows in FIG. 7) in the table in the lower part of FIG. 7.

The example of the method for selecting the registration data has been described above. The image processing system compares the illumination distributions with each other and specifies the illumination distribution similar to the illumination distribution obtained in step S1305. Accordingly, the image processing system can reduce processing load than a case in which variation images or feature amounts are compared with each other and the illumination distribution similar to the illumination distribution obtained in step S1305 is specified.

According to the present exemplary embodiment, the registration data corresponding to the illumination distribution specified as the illumination distribution similar to the illumination distribution obtained in step S1305 is stored in the secondary storage device 14 with respect to all persons. However, when collation is performed, there are some cases in which the information processing apparatus 1 have not been able to store registration data corresponding to a certain illumination distribution for all persons in the secondary storage device 14. For example, in the table in the lower part of FIG. 7, registration data (No. 3) of the illumination distribution information "2016/01/02 12:00:00" is stored for a person A. However, the registration data of the illumination distribution information "2016/01/02 12:00:00" is not stored for persons B and C.

This is because, the illumination distribution registration processing is executed on the background of the collation processing, however, generation of variation images and extraction of a feature amount are not in time. In such a case, the image processing system performs following processing when specifying the illumination distribution of the illumination distribution information "2016/01/02 12:00:00" as the illumination distribution similar to the illumination distribution obtained in step S1305. In other words, the image processing system detects that the registration data pieces of the all persons corresponding to the illumination distribution information "2016/01/02 12:00:00" are not stored in the secondary storage device 14. Further, the image processing system specifies the illumination distribution second similar (having the second highest similarity) to the illumination distribution obtained in step S1305 from the past illumination distributions and, when there are the registration data pieces of the all persons corresponding to the specified illumination distribution, performs collation using the feature amount included in the registration data.

According to the present exemplary embodiment, the selection unit 109 specifies only one illumination distribution similar to the illumination distribution obtained in step S1305 from the past illumination distributions, however, may specify a plurality of the illumination distributions similar to the illumination distribution obtained in step S1305. In this case, the selection unit 109 selects the registration data pieces respectively corresponding to the specified illumination distribution.

In addition, there is a case in which the image processing system has no illumination distribution similar to the illumination distribution obtained in step S1305 (there is no similarity having a predetermined threshold value or more in the similarities obtained in step S1308. In such a case, the image processing system may wait until registration data based on a new illumination distribution is registered by the illumination distribution registration processing. Further, the image processing system may perform collation based on the feature amount included in the registration data corresponding to the illumination distribution corresponding to the highest similarity in the similarities obtained in step S1308. Furthermore, the image processing system may perform collation based on the feature amounts included in the registration data pieces respectively corresponding to the illumination distributions corresponding to a predetermined number (for example, three pieces) of similarities from the highest in the obtained in step S1308.

In step S1307, the collation unit 110 selects one from the registration data pieces selected in step S1306 and performs control to execute the processing in steps S1308 and S1309 on the feature amount included in the selected registration data. The collation unit 110 repeats the processing and performs the control to execute the processing in steps S1308 and S1309 on all the feature amounts included in the registration data selected in step S1306.

In step S1308, the collation unit 110 collates a face of a person about to pass through the gate by performing following processing. The collation unit 110 obtains a similarity indicating a degree of similarity between the feature amount extracted in step S1304 and a feature amount included in the registration data selected in step S1307. The collation unit 110 obtains the similarity between the feature amounts using, for example, Formula 1. In this case, the term A in Formula 1 is a vector indicating the feature amount extracted in step S1304 and the term B in Formula 1 is a vector indicating the feature amount included in the registration data selected in step S1307.

In step S1309, the collation unit 110 determines whether the processing in step S1308 is executed on the feature amounts included in all the registration data pieces selected in step S1306. The collation unit 110 advances the processing to step S1311 when determining that the processing in step S1308 is executed on all the registration data pieces selected in step S1306. The collation unit 110 advances the processing to step S1307 when determining that there is the registration data selected in step S1306 which is not yet subjected to the processing in step S1308.

In step S1310, the collation unit 110 determines a final authentication result of whether to authenticate the person about to pass through the gate based on the similarities obtained in step S1308. More specifically, the collation unit 110 specifies a highest similarity in the similarities obtained in step S1308 and performs following processing when the specified similarity is the predetermined threshold value or more. In other words, the collation unit 110 collates that the face of the person about to pass through the gate is identical to the person's face indicated by the person information included in the registration data selected in step S1307 when the specified similarity is obtained in step S1308. The person's face indicated by the person information is an example of a first object. Further, the face of the person about to pass through the gate is an example of a second object. When it is collated that the face of the person about to pass through the gate is identical to the person's face indicated by the person information, the collation unit 110 authenticates the person about to pass through the gate. Further, when the specified similarity is less than the predetermined threshold value, the collation unit 110 does not authenticate the person about to pass through the gate because the person is not any of registered persons.

In step S1311, the output unit 111 transmits a result of the authentication processing in step S1310 to the external apparatus such as the gate control apparatus 6. The gate control apparatus 6 controls open and close of the flappers 7 according to the received result of the authentication processing. Accordingly, the image processing system can realize room access control for controlling whether a person can pass through the gate.

In step S1312, the collation unit 110 determines whether a completion instruction of the collation processing is received based on an input operation by a user via the operation input device 17. The collation unit 110 terminates the processing in the flowchart in FIG. 6 when determining that the completion instruction of the collation processing is received (YES in step S1312) and advances the processing to step S1301 when determining that the completion instruction of the collation processing is not received (NO in step S1312).

The example of the collation processing has been described above.

As described above, the image processing system compares illumination distributions captured at a site of collation with recorded past illumination distributions, specifies a similar illumination distribution, and performs collation using a feature amount included in registration data corresponding to the specified illumination distribution. As described above, the image processing system can improve accuracy of collation using the feature amount corresponding to the illumination distribution similar to the illumination distribution captured at the site of the collation.

According to the present exemplary embodiment, the input unit 103 obtains a two-dimensional image subjected to collation processing by capturing the image via the image capturing apparatus 5. However, the input unit 103 may obtain, for example, a three-dimensional image via the image capturing apparatus 5 and perform collation by obtaining a two-dimensional image rendered based on the obtained three-dimensional image. In addition, the input unit 103 may obtain a two-dimensional image subjected to collation processing from an external apparatus via a network.

According to the present exemplary embodiment, the image processing system obtains a similarity using vectors arranging pixel values of the entire illumination distributions in comparison of two illumination distributions with each other. However, for example, there is a case in which illumination conditions in a partial area in a real environment have a stronger influence than illumination conditions in another area. For example, in a room in a daytime on a sunny day, illumination conditions by a window area has a stronger influence than illumination conditions in other areas.

Thus, the image processing system may obtain, in step S1306, a similarity between the illumination distribution obtained in step S1305 and the illumination distribution obtained in the past only for a portion corresponding to a predetermined area (for example, a window area) included in the illumination distribution. Further, the image processing system may obtain illumination conditions of the predetermined area (for example, a window area) via the illumination distribution obtaining apparatus 4 and generate an illumination distribution representing the obtained illumination conditions.

Accordingly, the image processing system can reduce a processing burden.

According to the present exemplary embodiment, the image processing system executes the illumination distribution registration processing in the background of the collation processing. However, the image processing system may set a period for executing the illumination distribution registration processing by stopping the collation processing. Accordingly, the image processing system can accumulate the registration data more efficiently.

As described above, according to the present exemplary embodiment, the image processing system optically obtains illumination conditions in a real environment via the illumination distribution obtaining apparatus 4 and generates an illumination distribution representing the obtained illumination conditions. The image processing system generates a variation image based on the generated illumination distribution and a three-dimensional model of a person's face as a collation target object. Further, the image processing system executes following processing based on a feature amount of a face area extracted from an image of a person about to pass through the gate captured by the image capturing apparatus 5 and a feature amount of a face area extracted from the generated variation image. In other words, the image processing system collates whether the person about to pass through the gate is identical to the person corresponding to the variation image and thus executes authentication of the person about to pass through the gate.

As described above, the image processing system can collate a person more accurately by generating a variation image reflecting actual illumination conditions and using the variation image for collation.

According to the present exemplary embodiment, the image processing system generates a variation image in advance based on a three-dimensional model of each person as a collation target and the illumination distribution obtained in the past. Further, the image processing system detects a face area from the generated variation image, extracts a feature amount from the detected face area, and stores the extracted feature amount in association with corresponding person information and corresponding illumination distribution information as registration data in the secondary storage device 14. When authentication of a person about to pass through the gate is performed, the image processing system obtains the illumination distribution via the illumination distribution obtaining apparatus 4, specifies the illumination distribution similar to the obtained illumination distribution in the illumination distributions obtained in the past, and selects the registration data corresponding to the specified illumination distribution. Further, the image processing system executes collation of the person about to pass through the gate based on the feature amount included in the selected registration data and the feature amount extracted from the face area of the image of the person about to pass through the gate captured via the image capturing apparatus 5.

In other words, the image processing system does not need to generate a variation image used for collation and extract a feature amount using the obtained illumination distribution via the illumination distribution obtaining apparatus 4 again in collation. Accordingly, the image processing system can speed up collation processing of a person.

According to the first exemplary embodiment, the image processing system compares an illumination distribution obtained in collation and illumination distributions obtained in the past to select registration data including a feature amount used for collation from among a plurality of registration data pieces. According to a second exemplary embodiment, an image processing system as environment information regarding a real environment when an illumination distribution is obtained with each of the illumination distributions obtained in the past and stores the environment information in the secondary storage device 14. Further, the image processing system obtains environment information of a real environment of a place to be collated in collation and specifies an illumination distribution similar to an illumination distribution representing illumination conditions in the real environment in the collation from past illumination distributions stored in a secondary storage device based on the obtained environment information.

A system configuration of the image processing system according to the present exemplary embodiment is similar to that according to the first exemplary embodiment. A hardware configuration of the information processing apparatus 1 is also similar to that according to the first exemplary embodiment.

FIG. 8 illustrates an example of a function configuration of the information processing apparatus 1 according to the present exemplary embodiment. The information processing apparatus 1 according to the present exemplary embodiment includes an environment information obtaining unit 212 in addition to each functional component illustrated in FIG. 3.

The environment information obtaining unit 212 obtains environment information when an illumination distribution is obtained by the illumination distribution obtaining unit 108 via the illumination distribution obtaining apparatus 4 and adds the obtained environment information into registration data corresponding to the obtained illumination distribution. The storage unit 106 stores the registration data including the environment information in the secondary storage device 14. The environment information is information regarding a real environment such as a date and time, weather, an ambient temperature, humidity, a place, and the number of surrounding people. The environment information obtaining unit 212 can obtain the environment information such as an ambient temperature, humidity, a place, and the number of surrounding people via sensors such as a temperature sensor, a photosensitive sensor, a humidity sensor, a global positioning system (GPS) sensor, and a human detection sensor. The environment information obtaining unit 212 can also obtain the number of surrounding people by detecting a person from an image captured via the image capturing apparatus 5. The environment information obtaining unit 212 can further obtain the environment information such as a date and time and weather by searching information from, for example, the Web.

The storage unit 106 accumulates information pieces of past illumination distributions by storing the illumination distributions obtained from the illumination distribution obtaining unit 108 in association with the environment information obtained by the environment information obtaining unit 212 in the secondary storage device 14. FIG. 9 illustrates an example of information pieces of illumination distributions stored by the storage unit 106. The selection unit 109 uses the information to specify an illumination distribution similar to the illumination distribution obtained in the collation from the past illumination distributions stored in the secondary storage device 14.

An example of processing by the selection unit 109 according to the present exemplary embodiment is described. The selection unit 109 compares the environment information pieces with each other without comparing the illumination distributions with each other unlike the first exemplary embodiment. The selection unit 109 obtains the environment information of a place (near the gate) to be collared in the collation. The obtained environment information is an example of second environment information regarding a real environment when input image is captured. The selection unit 109 selects the illumination distribution similar to the illumination distribution representing the illumination conditions in the real environment in the collation from among the past illumination distributions based on the obtained environment information and the environment information stored in association with the past illumination distributions. The environment information stored in association with the past illumination distributions is an example of first environment information regarding the real environment when the illumination distribution was obtained in the past.

More specifically, the selection unit 109 selects the illumination distribution similar to the illumination distribution representing the illumination conditions in the real environment in the collation based on, for example, a coincidence of the environment information. The selection unit 109 specifies the environment information coinciding with the environment information obtained in the collation from, for example, the environment information pieces stored in association with the past illumination distributions. Further, the selection unit 109 specifies the illumination distribution associated with the specified environment information as the illumination distribution similar to the illumination distribution representing the illumination conditions in the real environment in the collation.

The selection unit 109 may specify the environment information in which corresponding information pieces of weather, an ambient temperature, and a place coincide with those in the environment information obtained in the collation from the environment information pieces stored in association with the past illumination distributions. Further, the selection unit 109 may specify the illumination distribution associated with the specified environment information as the illumination distribution similar to the illumination distribution representing the illumination conditions in the real environment in the collation.

The selection unit 109 may specify the environment information in which at least one or more predetermined information pieces of a date and time, weather, humidity, an ambient temperature, a place, and the number of surrounding people coincides with that in the environment information obtained in the collation from the environment information pieces associated with the past illumination distributions. Further, the selection unit 109 may specify the illumination distribution associated with the specified environment information as the illumination distribution similar to the illumination distribution representing the illumination conditions in the real environment in the collation. For example, when the number of surrounding people is large, the illumination distribution may vary since illumination is obscured by people. Thus, the selection unit 109 uses the number of surrounding people as a selection reference and can specify an appropriate illumination distribution even in such a case.

The selection unit 109 may specify the environment information similar to the environment information obtained in the collation from, for example, the environment information pieces stored in association with the past illumination distributions. Further, the selection unit 109 may specify the illumination distribution associated with the specified environment information as the illumination distribution similar to the illumination distribution representing the illumination conditions in the real environment in the collation.

For example, when a difference between the environment information pieces stored in association with the past illumination distributions and the environment information obtained in the collation is a predetermined threshold value or less, the selection unit 109 performs following processing. In other words, the selection unit 109 specifies the illumination distribution corresponding to the environment information stored in association with the past illumination distribution as the illumination distribution similar to the illumination distribution representing the illumination conditions in the real environment in the collation. For example, when differences of a temperature, humidity, and a place between the environment information stored in association with the past illumination distribution and the environment information obtained in the collation are predetermined threshold values or less, the selection unit 109 may perform following processing. In other words, the selection unit 109 may specify the illumination distribution corresponding to the environment information stored in association with the past illumination distribution as the illumination distribution similar to the illumination distribution representing the illumination conditions in the real environment in the collation.

Further, when the number of surrounding people is few in the collation, in other words, when a person about to pass through the gate is a predetermined threshold value (for example, two) or less, the image processing system may perform following processing to collate more accurately rather than more quickly. In other words, the image processing system generates registration data based on the illumination distribution obtained via the illumination distribution obtaining apparatus 4 in the collation. Further, the image processing may perform collation based on a feature amount included in the generated registration data and feature amount extracted from an image captured via the image capturing apparatus 5 in the collation.

As described above, according to the present exemplary embodiment, the image processing system compares the environment information pieces and specifies the illumination distribution similar to the illumination distribution representing the illumination conditions in collation. Accordingly, the image processing system can reduce a processing amount than a case in which the distributions are compared with each other. In the case of outdoors, an illumination distribution depends on environment information such as a season, time, and a place, so that the image processing system can specify the illumination distribution similar to the illumination distribution representing the illumination conditions in the collation based on the environment information.

For example, the whole or a part of the function configuration of the above-described image processing system may be implemented as hardware in the information processing apparatus 1.

When the image processing system obtains an illumination distribution in every predetermined interval and generates registration data as in the first exemplary embodiment, there is a possibility that the image processing system cannot cope with a sudden change in a weather and turning on and off of an illumination facility. In such a case, the image processing system may set a time interval for obtaining the illumination distribution to a predetermined value or less via the illumination distribution obtaining apparatus 4 and perform following processing every time the illumination distribution is obtained. In other words, the image processing system may compare the obtained illumination on distribution with a latest illumination distribution in the past, store the obtained illumination distribution only when the illumination distributions are not similar to each other, and generate and register corresponding registration data. In this case, the information processing apparatus 1 may include a processing resource capable of withstanding a calculation load repeating storing of the illumination distribution and generation of the registration data. Further, the image processing system may perform the above-described processing only when collation processing is not performed.

According to the first and the second exemplary embodiments, the image processing system performs collation of a person's face, however, may perform collation of another object such as a whole person, an upper body of a person, a vehicle, an animal, and freight.

According to the first and the second exemplary embodiments, the information processing apparatus 1 is described as a single information processing apparatus, however, may be a plurality of personal computers (PCs), server apparatuses, and tablet devices. In this case, a CPU of each information processing apparatus included in the information processing apparatus 1 executes processing in cooperation with each other based on a program stored in an auxiliary storage device of each information processing apparatus, and thus the functions in FIGS. 3 and 8 and the processing in the flowcharts in FIGS. 4 to 6 are realized.

Various exemplary embodiments have been described in detail above, however, the embodiments are not limited to the specific exemplary embodiments. The above-described exemplary embodiments may be arbitrarily combined.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), storage of distributed computing systems, an optical disk (such as a compact disc (CD), digital versatile disc (DVD), or Blu-ray Disc (BD)™), a flash memory device, a memory card, and the like.

While the above has been described with reference to exemplary embodiments, it is to be understood that the description is not limited to the disclosed exemplary embodiments. The scope of the following claims is to be accorded the broadest interpretation so as to encompass all such modifications and equivalent structures and functions.

This application claims the benefit of Japanese Patent Application No. 2017-147944, filed Jul. 31, 2017, which is hereby incorporated by reference herein in its entirety.

What is claimed is:

1. An information processing apparatus comprising:
one or more memories storing instructions; and
one or more processors that, upon execution of the instructions, are configured to
obtain a captured image capturing a target object in a real environment;
obtain an illumination condition in the real environment;
generate a variation image as an image of a registration object reflecting the illumination condition based on data of the registration object and the obtained illumination condition; and collate the registration object with the target object based on a feature of the variation image and a feature of the captured image, wherein the variation image has an illumination condition similar to the captured image when captured and is an image in a plurality of variation images generated in advance based on the data of the registration object and each of a plurality of illumination conditions.

2. The information processing apparatus according to claim 1, wherein execution of the instructions further configures the one or more processors to obtain an illumination condition in the real environment via a measurement apparatus which optically performs measurement.

3. The information processing apparatus according to claim 1, wherein execution of the instructions further configures the one or more processors to obtain an illumination condition including a condition regarding an illumination direction.

4. The information processing apparatus according to claim 1, wherein execution of the instructions further configures the one or more processors to obtain an illumination condition including a condition regarding illumination intensity.

5. The information processing apparatus according to claim 1, wherein execution of the instructions further configures the one or more processors to obtain an illumination condition including a condition regarding a color temperature of illumination.

6. The information processing apparatus according to claim 1, wherein execution of the instructions further configures the one or more processors to specify a variation image of which an illumination condition is similar to that when the captured image is captured in the plurality of variation images based on a similarity between illumination conditions respectively corresponding to the plurality of variation images and an illumination condition obtained when the captured image is captured and collates the registration object with the target object based on a feature of the specified variation image and the feature of the captured image.

7. The information processing apparatus according to claim 6, wherein execution of the instructions further configures the one or more processors to specify a variation image of which an illumination condition is similar to that when the captured image is captured in the plurality of variation images based on a similarity between illumination conditions of a predetermined area respectively corresponding to the plurality of variation images and an illumination condition of the predetermined area obtained when the captured image is captured and collates the registration object with the target object based on a feature of the specified variation image and the feature of the captured image.

8. The information processing apparatus according to claim 1, further comprising a storage configured to store the plurality of generated variation images therein, wherein execution of the instructions further configures the one or more processors to collate the registration object with the target object based on a feature of a variation image of which an illumination condition is similar to that when the captured image is captured in the plurality of variation images stored in the storing unit and the feature amount of the captured image.

9. The information processing apparatus according to claim 8, wherein, in a case where a variation image of which an illumination condition is similar to that of a newly generated variation image is already stored in the storage, the storage does not store the newly generated variation image.

10. The information processing apparatus according to claim 1, wherein execution of the instructions further configures the one or more processors to specify a variation image of which an illumination condition is similar to that when the captured image is captured from the plurality of variation images based on first environment information regarding a real environment when the plurality of illumination conditions is respectively obtained and second environment information regarding a real environment when the captured image is captured and collates the registration object with the target object based on a feature of the specified variation image and the feature of the captured image.

11. The information processing apparatus according to claim 10, wherein the first environment information and the second environment information respectively include information of time when the illumination condition is obtained.

12. The information processing apparatus according to claim 9, wherein the first environment information and the second environment information respectively include information of weather when the illumination condition is obtained.

13. The information processing apparatus according to claim 10, wherein the first environment information and the second environment information respectively include information of a place where an illumination condition is obtained.

14. The information processing apparatus according to claim 10, wherein the first environment information and the second environment information respectively include information of a condition of a person existing in a place where an illumination condition is obtained.

15. The information processing apparatus according to claim 14, wherein the condition of the person is a number of persons.

16. The information processing apparatus according to claim 1, wherein the registration object and the target object is a person's face.

17. A method for processing information, the method comprising:

obtaining a captured image capturing a target object in a real environment;

obtaining an illumination condition in the real environment;

generating a variation image as an image of a registration object reflecting the illumination condition based on data of the registration object and the obtained illumination condition; and collating the registration object with the target object based on a feature of the variation image and a feature of the captured image, wherein the variation image has an illumination condition similar to the captured image when captured and is an image in a plurality of variation images generated in advance based on the data of the registration object and each of a plurality of illumination conditions.

18. A non-transitory computer-readable storage medium storing a program causing that configures a computer to:

obtain a captured image capturing a target object in a real environment;

obtain an illumination condition in the real environment;

generate a variation image as an image of a registration object reflecting the illumination condition based on data of the registration object and the obtained illumination condition; and collate the registration object with the target object based on a feature of the variation image and a feature of the captured image, wherein the variation image has an illumination condition similar to the captured image when captured and is an image in a plurality of variation images generated in advance based on the data of the registration object and each of a plurality of illumination conditions.

\* \* \* \* \*